US006700690B1

(12) United States Patent
Buchsbaum et al.

(10) Patent No.: US 6,700,690 B1
(45) Date of Patent: Mar. 2, 2004

(54) TUNABLE VARIABLE BANDPASS OPTICAL FILTER

(75) Inventors: Philip E. Buchsbaum, Dunedin, FL (US); James D. Lane, Dunedin, FL (US)

(73) Assignee: Ocean Optics, Inc., Dunedin, FL (US)

( * ) Notice: Subject to any disclaimer, the term of this patent is extended or adjusted under 35 U.S.C. 154(b) by 112 days.

(21) Appl. No.: 09/969,483

(22) Filed: Oct. 2, 2001

Related U.S. Application Data

(60) Provisional application No. 60/237,323, filed on Oct. 2, 2000.

(51) Int. Cl.[7] .............................................. G02B 26/02
(52) U.S. Cl. ...................... 359/230; 359/234; 359/236; 359/578; 359/889; 359/891
(58) Field of Search ................................ 359/578, 230, 359/233, 234, 236, 577, 579, 580, 581, 589, 590, 888, 889, 890, 891

(56) References Cited

U.S. PATENT DOCUMENTS

| | | | | |
|---|---|---|---|---|
| 4,290,473 A | * | 9/1981 | Pierson et al. ............... 160/120 |
| 4,963,004 A | * | 10/1990 | Sato et al. ................... 359/485 |
| 5,128,798 A | * | 7/1992 | Bowen et al. ............... 359/260 |
| 5,148,288 A | * | 9/1992 | Hannah ....................... 382/167 |
| 6,031,613 A | * | 2/2000 | Washington ................ 356/364 |
| 6,459,844 B1 | * | 10/2002 | Pan ............................ 385/140 |

* cited by examiner

*Primary Examiner*—Drew Dunn
*Assistant Examiner*—Joshua Pritchett
(74) *Attorney, Agent, or Firm*—Dennis L. Cook, Esq.; Fowler White Boggs Banker, P.A.

(57) ABSTRACT

A variable bandwidth tunable optical filters comprised of two transparent optical substrates, upon each of which is deposited a linearly variable multilayer interference filter coating which varies in total thickness from end to end in a wedged fashion. This wedge imparts a corresponding variation of the center wavelength of the filter bandpass with respect to the linear position of the coated filter substrates. The variable bandpass tunable filter can be adjusted to a specific center wavelength by moving the filter pair together linearly through the incident beam. The bandwidth of the filter pair is maximized when the two filters are spectrally aligned, and is determined by the bandwidth of the individual filters. The variable bandwidth of the tunable filter can be adjusted by introducing a relative linear offset between the linearly variable filter pair.

21 Claims, 5 Drawing Sheets

TUNABLE VARIABLE BANDPASS OPTICAL FILTER

CROSS-REFERENCE TO RELATED APPLICATION

The present application claims the benefit of previously filed co-pending Provisional Patent Application, Serial No. 60/237,323 filed Oct. 2, 2000.

FIELD OF THE INVENTION

This invention relates, generally, to optical filters and more particularly to a variable bandwidth tunable optical filter that is comprised of two transparent optical substrates, upon each of which is deposited a linearly variable multilayer interference filter coating such that the variable bandpass tunable filter can be adjusted to a specific center wavelength by moving the filter pair together linearly through the incident beam and the variable bandwidth of the tunable filter can be adjusted by introducing a relative linear offset between the linearly variable filter pair.

BACKGROUND OF THE INVENTION

Various types of optical filters have been developed in the past, most often for optical devices known generally as spectrometers that are used for measuring and analyzing the spectral or color content of electromagnetic radiation in the frequency range or spectrum of optical wavelengths. These include from ultraviolet, through visible, to near-infrared wavelengths, which include the portion of the electromagnetic spectrum producing photoelectric effects, referred to herein as "light." Also, various kinds of opto-electronic devices employing optical filters are used for both imaging applications, as by inspecting the spectral reflectance characteristics of a two-dimensional object, and for non-imaging applications.

Spectrometric measurements of light are performed in basically two ways, dispersion-based techniques and filter-based techniques. In the dispersion-based approach, a radiation dispersion device such as a prism or diffraction grating is used to separate the incident polychromatic light into its spectral contents. The spectrally separated light is then projected onto a photodetector to measure the relative intensity in each spectral range. While dispersion-based devices can be effectively used in some applications, they have the disadvantage of being easily knocked out of alignment during use, and thus not suitable for more rigorous applications in the field.

In the filter-based approach to spectral measurement, various types of optical filters are used in conjunction with photodetectors to measure and analyze light. For example, in one approach, a single band-pass filter is placed over a detector to measure a single spectral band of the incident light. In another variation of the filter-based technique, a filter wheel on which several filters are mounted is used in conjunction with a single photodetector or several photodetectors. Alternatively, the discrete filters in the filter wheel can be replaced with a continuous circular variable filter (CVF) which is placed over a detector. Further, the CVF may be placed over several detectors to provide simultaneous spectra in a limited number of bands. These filter-based techniques are limited for practical reasons to use in low resolution spectral measurements of a few bands of light and to non-contiguous bands only.

Other spectrometer devices have been developed that utilize linear variable filters in an attempt to enhance light measuring capabilities. For example, U.S. Pat. No. 5,166,755 to Gat discloses a spectrometer apparatus including a spectrum resolving sensor containing an opto-electronic monolithic array of photosensitive elements which form a photodetector, and a continuous variable optical filter such as a linear variable filter (LVF) that is placed in an overlaying relationship with the photodetector. The LVF and photodetector are mounted in a single housing which serves to support at least the filter and the array in a unitary sensor assembly. The LVF is formed by depositing optical coatings directly onto the photodetector array, or a preformed LVF may be positioned in contact with or slightly above the array.

In U.S. Pat. No. 5,218,473 to Seddon et al., a leakage-corrected linear variable filter is disclosed. This patent describes a conventional linear variable filter system as including an LVF positioned in a spaced apart relationship with a linear detector such as a charge coupled device array. The LVF is paired with a linear detector having comparable dimensions in order to form a detector capable of receiving and discriminating a number of wavelengths of radiation simultaneously.

The use of linear variable filters in spectrometer devices has been limited because of fundamental packaging problems. Depositing an optical coating on the surface of a detector to form an LVF is problematic because of the delicate surface and wiring of the detector array. The placement of a preformed LVF on the surface of the detector array requires the removal of a cover glass that protects the delicate surface of the detector array. Such placement of an LVF during manufacture can damage the surface of the detector array.

Further, the LVF is prone to have diffuse leaks that downgrade its spectral performance and which are unavoidable when the LVF is placed in contact with the detector array surface. The LVF filter works properly only within a limited cone angle of light (numeric aperture). Light outside this limited angle may contain diffuse leaks. The detector array is capable of receiving light within the full hemisphere and will detect the diffuse leaks when placed in contact with or very close to the LVF. In addition, if the LVF is spaced apart from the surface of the detector array, then the LVF will not perform properly since light emitted from one position of the LVF may reach more than one element of the detector array, thereby limiting the spectra resolving power of the LVF.

Accordingly, there is a need for an optical filter that overcomes or avoids the above problems and limitations.

In order to be useful in most applications, an optical filter that is designed to transmit only a given narrow band of wavelengths must sufficiently reject all other wavelengths for which source energy and detector sensitivity both exist. That is, light of all other wavelengths outside this narrow spectral band and within a range set by the limits of the source and the detector must be blocked in order for the filter to operate with the given source and detector. In the case of induced transmittance or Fabry-Perot-type metal dielectric filters, the rejection occurs naturally and such filters can be designed with wide-band blocking without complicating the design of the filter.

All-dielectric bandpass filters can be much more environmentally stable than metal dielectric filters and are preferred in many applications. Their disadvantage is that the bandpass provides natural blocking for only a narrow band of wavelengths above and below the pass band. Additional blocking requires additional stacks of layers, each stack blocking a specific range of wavelengths. Several quarterwave optical thickness (QWOT) stacks generally provide this additional blocking. A quarterwave stack is characterized by its center wavelength in that the stack blocks light by reflection over a wavelength range around its center wavelength. The width of the wavelength range of the stack depends on the stack configuration and the ratio of the indices of refraction of the two coated materials used in the stack. The depth of blocking is controlled by the number of layers in the stack.

It is not uncommon for the all-dielectric filters to have upwards of 200 total layers. Typically, only a relatively few such layers can be formed on a single surface. Thus, these layers must be distributed over several surfaces, for example, over two to four surfaces on one or two substrates, to minimize and balance coating stresses. Otherwise, the use of two substrates with a small air space is acceptable, and in a number of applications it is perfectly acceptable to coat two surfaces of the same substrate.

An exception is found in linear-variable narrow-band filters. These are filters in which the thickness of the coating layers, and hence the wavelength of the pass band, is varied linearly, or at least monotonically, along a dimension of the filter. If such a filter is used in conjunction with an extended detector such as a linear array, it is desirable to mount the filter with the wavelength-defining bandpass layers on a surface very close to the array. Where blocking layers are on other parallel surfaces, if energy from the source is not all at normal incidence, it is possible for some of the non-normal energy to enter past the blocking filters at one point in the filter detector or assembly and to precess between parallel surfaces and reemerge anomalously at another point on the filter.

In addition to the above-discussed precessive leakage phenomenon, so-called "diffuse leaks" have been a serious problem in all-dielectric linear variable filters. Diffuse leaks were found in certain infrared filters some 15 years ago. The problem was thought to be caused by scatter in one of the coating materials (cadmium selenide) used in the filters. Diffuse leaks in visible filters have not usually been a major problem, partly because the materials used for such filters have had low scatter, and partly because there were no applications for visible filters requiring that the filter be positioned close to the detector. In contrast, in LVF filter devices, the filter is placed very close to the detector array, the coating materials are somewhat scattering, and (as discussed above), the filter contains a very large number of layers. As a consequence, diffuse leaks are observed in these filters.

Although the mechanism by which so-called diffuse leaks occur is not well understood in the prior art, it is thought that such leaks may occur when the individual layers of the filter have rough surfaces, when there exist imperfections between-layer interfaces, or as described above, when the individual layers of the filter contain light scattering material. Regardless of how many layers the stack contains, if the stack contains scattering materials or interfaces, some of the light will be scattered at high angles and exit the stack. (These diffuse leaks are not to be confused with specular leaks, which go straight through the stack.).

Also, a variety of optical filters have been developed to differentiate optical signals based on their wavelength. These filters are often used in telecommunication applications such as dense wavelength division multiplex systems. For example, thin film optical filters can selectively pass signals having wavelengths that are less than a nominal maximum wavelength. Such low wavelength pass filters can be combined with similar thin film filter structures that selectively pass optical signals having a wavelength greater than some minimum nominal wavelength. By careful selection of the individual filter structures and the corresponding minimum and maximum nominal wavelengths, multicavity bandpass filters having fairly narrow wavelength transmission ranges can be produced.

Unfortunately, a single narrow bandpass filter cannot always provide the desired filtering performance for dense wavelength division multiplex systems. Specifically, some portion of the optical signal which is outside of the nominal range of a multicavity narrow bandpass filter typically "leaks through" with the filtered signal. This leakage can lead to cross talk between signals of differing wavelengths.

It is known that it can be helpful to isolate the discrete individual wavelengths in a multiplex system using two or more multicavity narrow bandpass filters in series. For such multi-filter arrangements to substantially enhance filtering performance, the two filters should operate at wavelengths which are as identical as possible. In particular, the central wavelength value of narrow bandpass filters used in series should be substantially the same, or each filter will operate individually at the upper or lower ends of the nominal range, and filter performance will not be improved (beyond that of a single filter structure) to the full extent possible.

Unfortunately manufacturing limitations for narrow bandpass filters limit the number of filters having identical central wavelengths. Hence, the usable filter pairs in each coating run are quite limited. This limited yield greatly increases the cost of matching or "tuned" narrow bandpass filters. Work in connection optical filters has improved matched filter yield somewhat by selectively baking filters in a particular temperature sequence to shift the filter central wavelength using the elastic theory of material. Although such selective baking can shift the filter wavelengths, the accuracy of this method is somewhat limited, so that several bakings are often needed.

The present invention solves or substantially mitigates the above problems by providing a mechanism for mechanically tuning optical filters with very high degrees of accuracy and repeatability, and allows the tuning adjustment range and sensitivity to be tailored for a particular filtering application.

There are a number of patents disclosing various means of solving these problems and creating variable optical filters such as U.S. Pat. No. 5,872,655 issued to Seddon, et al. on Feb. 16, 1999 entitled Monolithic linear variable filter and method of manufacture that discloses a process suitable for forming multi-layer (up to at least several hundred layers) monotonic/linear variable/wedge filter coatings on a single substrate surface and for forming monolithic filter assemblies which incorporate such filters, is disclosed along with the designs for such filters. The monolithic process uses radially variable filter fabrication techniques in combination with ion-assisted deposition to form stress controlled, radially variable filter coatings of the desired varied optical profile, preferably using high and low index materials such as tantala and silica. Stress is minimized by balancing the amount of ion assist and the coating rate. Slices are cut radially from the substrate to form quasi-linear variable filters. Other coatings such as, but not limited to, a wide band hot mirror can be formed on the opposite surface of the substrate from the radially variable LVF method. The method forms complex multi-layer thick filters with high yields on a single substrate surface such that the filter is free of precession or sideways leakage of light between the parallel surfaces. Also disclosed is an optical filter having stacks arranged so that the magnitude of the characteristic center wavelength of each stack increases from stack to stack along the desired direction of traversal of incident light through the filter. As a result of this sequential construction, diffuse leaks are blocked from transmission through the filter. The diffuse leak-suppressed filter can be formed by various processes, including the monolithic process.

Also U.S. Pat. No. 6,057,925 issued to Anthon on May 2, 2000 entitled Compact spectrometer device discloses a color measuring sensor assembly that includes an optical filter such as a linear variable filter, and an optical detector array positioned directly opposite from the optical filter a predetermined distance. A plurality of lenses, such as gradient index rods or microlens arrays, are disposed between the optical filter and the detector array such that light beams propagating through the lenses from the optical filter to the detector array project an upright, noninverted image of the optical filter onto a photosensitive surface of the detector array. The color measuring sensor assembly can be incorporated with other standard components into a spectrometer device such as a portable calorimeter having a compact and rugged construction suitable for use in the field.

U.S. Pat. No. 6,040,944 issued to Pan, et al. on Mar. 21, 2000 entitled Precision tunable optical filter discloses tuned optical filters, filter systems, and methods for tuning filters that make use of a tilted filter rotated about an oblique axis of a collimating lens or other structure. This rotation varies an angle of incidence of an optical signal directed at the filter at an oblique angle to the axis of rotation. Very fine adjustments of optical filters such as for tuning a first narrow bandpass filter to match a center wavelength of another narrow bandpass filter, can be provided with small angles between the axis of rotation and a normal to the filter surface, and also between the axis of rotation and the optical path for the incident light. Mechanical adjustment to the filtering frequency is facilitated by making use of a rotational motion about the axis of a GRIN collimating lens.

Finally, U.S. Pat. No. 5,926,317 issued to Cushing on Jul. 20, 1999 entitled Multilayer thin film dielectric bandpass filter discloses a design for producing bandpass filters with passbands that are centered at the same wavelength for each mode of polarization. Filters are of the all-dielectric type that consist of single and multiple cavities of bandpasses. All of the layers are of the Quarterwave type for ease of manufacture with the possible exception of the last few layers being modified to reduce reflection into a new media. The basic structure of the multi-layer bandpass filter is as follows: $(XY).sup.n(YY)(XX).sup.m(YY)(YX).sup.n$ where n and m are integers and wherein X is one of a high refractive index layer and a low refractive index layer; and, wherein Y is the other of the high and low refractive index layer, X and Y being opposite indexes of refraction.

Given the above review of the prior art it is clear there is a need for a simple to manufacture and operate optical filter with a tunable center wavelength, and with adjustable bandwidth. This disclosure provides a next generation, narrow bandwidth optical filter solution using current bandwidth filters. The wide bandwidth filter elements used in this invention have a higher process yield than a corresponding single narrow bandwidth filter. Also, using identical linearly variable filter elements streamlines the manufacturing flow. This tunable filter can be easily operated under servo/software control for rapid change of center wavelength and bandwidth in multi-channel operations. The addition of a linearly variable neutral density filter would also allow for throughput gain adjustment. Finally, this filter is compatible with algorithms for signal enhancement since the shape of the filter bandpass remains stable across the tunable range of the linearly variable filters.

SUMMARY OF THE INVENTION

This breakthrough in variable bandwidth tunable optical filters is comprised of two transparent optical substrates, upon each of which is deposited a linearly variable multilayer interference filter coating which varies in total thickness from end to end in a wedged fashion. This wedge imparts a corresponding variation of the center wavelength of the filter bandpass with respect to the linear position of the coated filter substrates. The variable bandpass tunable filter can be adjusted to a specific center wavelength by moving the filter pair together linearly through the incident beam. The bandwidth of the filter pair is maximized when the two filters are spectrally aligned, and is determined by the bandwidth of the individual filters. The variable bandwidth of the tunable filter can be adjusted by introducing a relative linear offset between the linearly variable filter pair.

It is therefore clear that a primary object of this invention is to advance the art of optical filter manufacture. A more specific object is to advance said art by providing a new variable bandwidth tunable optical filter and a simple method for the manufacture of such optical filters These and other important objects, features, and advantages of the invention will become apparent as this description proceeds. The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

The Variable Bandwidth Tunable Filter of the preferred embodiment is designed for use in dense wavelength division multiplexing (DWDM) telecommunications applications but those skilled in the art will recognize the many other applications this variable bandwidth tunable optical filter could be used for.

Figure 1:
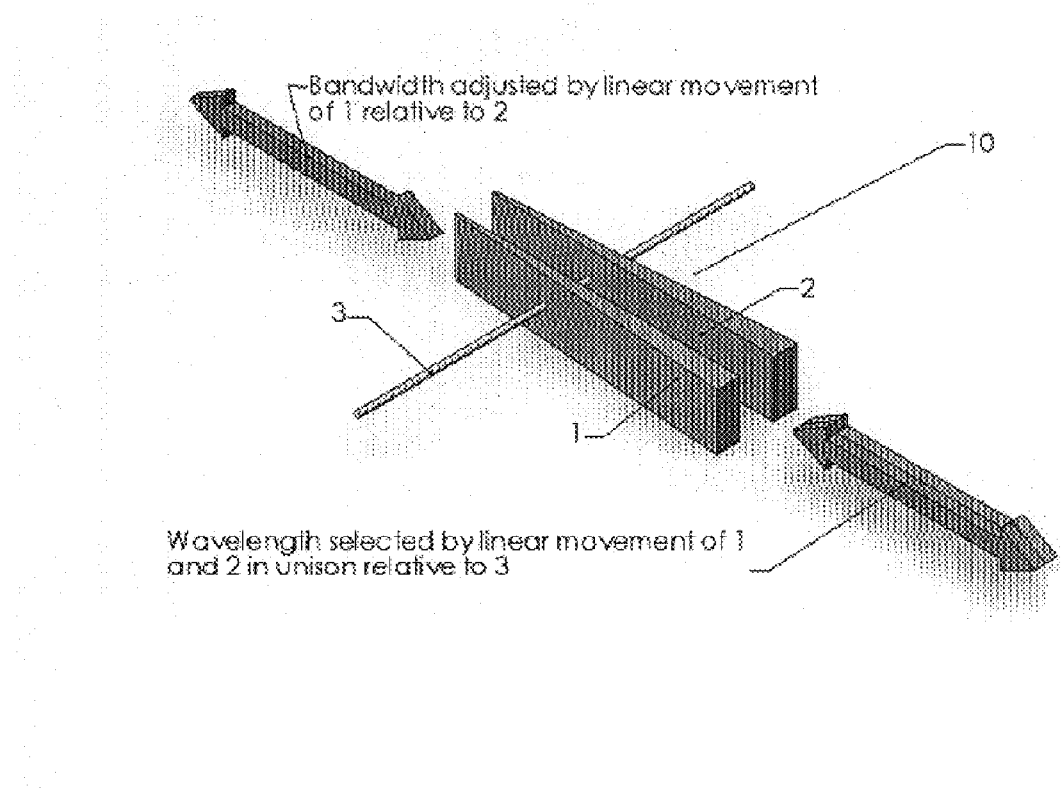
FIG. 1 is a drawing of the Tunable Variable Bandpass Optical Filter.

Referring now to FIG. 1, it will there be seen that an exemplary embodiment of the invention is denoted as a whole by the reference numeral 10.

In the preferred embodiment the variable bandwidth tunable optical filter (10) is comprised of two transparent optical substrates, upon each of which is deposited a linearly variable multilayer interference filter coating which varies in total thickness from end to end in a wedged fashion, creating a filter pair (1 and 2). The wedged coating imparts a corresponding variation of the center wavelength of the filter bandpass with respect to the linear position of the filter pair (1 and 2).

The variable bandwidth tunable optical filter (10) can be adjusted to a specific center wavelength by moving the filter pair (1 and 2) together linearly through the incident beam (3). The bandwidth of the filter pair (1 and 2) is maximized when the two filters (1 and 2) are spectrally aligned, and is determined by the bandwidth of the individual filters (1 and 2). The variable bandwidth of the variable bandwidth tunable optical filter (10) can be adjusted by introducing a relative linear offset between the linearly variable filter pair (1 and 2).

The variable bandwidth tunable optical filter (10), as shown in the preferred embodiment, is based on linearly variable thin-film dielectric filter coatings, the deposition of which is well known to those skilled in the art. The dielectric filter coatings are deposited on the filter pair (1 and 2) such that the variable bandwidth tunable optical filter (10) operates in the ITU "C" band, with a tunable range of 1500 to 1600 nm. Since bandwidth is adjustable, channel spacings of 400 Ghz, 200 Ghz, and 100 Ghz can be accommodated with a single device. Alternate models, such as one operating in the 1310 nm range, are considered within the scope of this disclosure and would be easily constructed by one skilled in the art after review of this disclosure.

The individual filters (1 and 2) are each 42 mm long, 9 mm wide, and 1 mm thick. The separation between the individual filters (1 and 2) is 0.5 to 1.0 mm. The linear travel between the individual filters (1 and 2) is 35 mm.

The transmitted beam (3) to be filtered is collimated and as used in the preferred embodiment is 50–100 microns in diameter.

The filters (1 and 2) in this embodiment can be positioned manually, or via servo control by methods well known to those skilled in the art. For example the filters (1 and 2) in the preferred embodiment could each be mounted on an individual linear translation slide mechanism, driven by a manual adjustment screw, cam, or other mechanical means, or by an electric stepper motor or piezoelectric drive actuator and related drive components. When electronic drives are used, software algorithms and closed-loop feedback control may be utilized for tuning and calibration, as well as improving signal to noise and other optical and electronic parameters.

Figure 2:
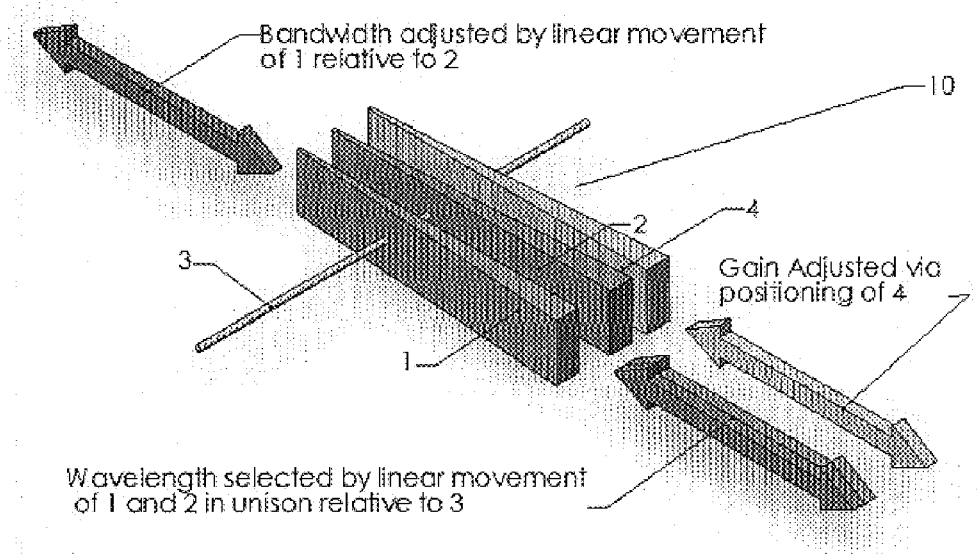
FIG. 2 is a drawing of the Tunable Variable Bandpass Optical Filter with the enhancement of gain control.

The addition of a linearly variable neutral density filter (4) as shown in FIG. 2 would also allow for throughput gain adjustment by linear positioning of the linearly variable neutral density filter (4) with respect to the filters (1 and 2). A circularly variable neutral density filter could also be employed, with gain adjustment by axial rotation of the circularly variable neutral density filter with respect to filters (1 and 2).

Figure 3:
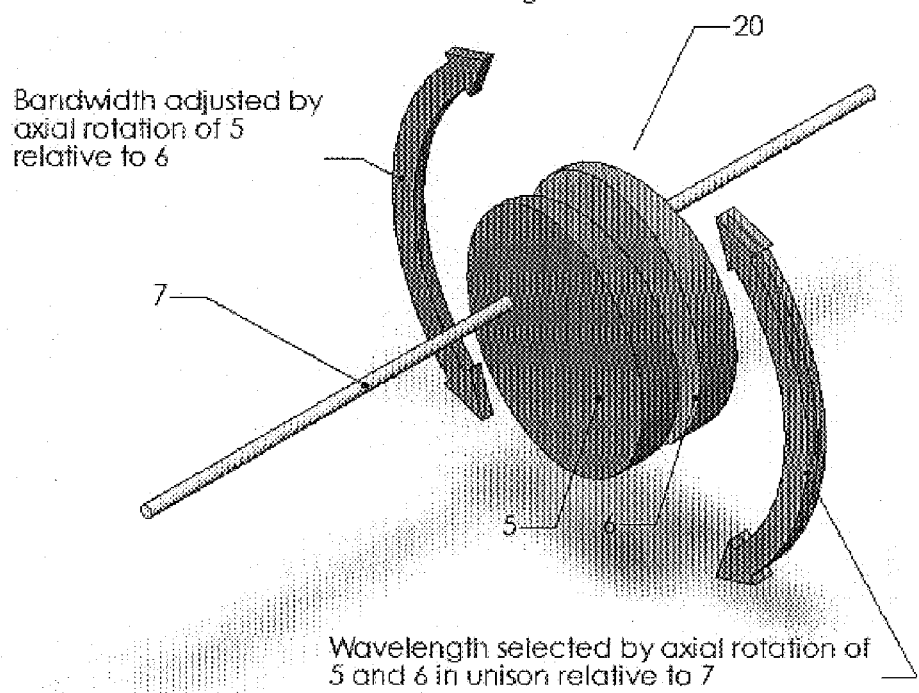
FIG. 3 is a drawing of the circularly configured Tunable Variable Bandpass Optical Filter.

An alternate embodiment (20) shown in FIG. 3 consists of a pair of circularly variable filter discs (5 and 6), each with a diameter of 25 to 50 mm, and a 1 mm thickness. The filter discs (5 and 6) can be rotated through the transmitted beam (7) in unison (to select center wavelength) or individually (to adjust bandwidth).

The filter discs (5 and 6) in this alternative embodiment can be positioned manually, or via servo control by methods well known to those skilled in the art. For example the filter discs (5 and 6) could each be mounted on individual rotating shaft mechanisms, driven by a manual adjustment screw, cam, or other mechanical means, or by an electric stepper motor or piezoelectric drive actuator and related drive components. When electronic drives are used, software algorithms and closed-loop feedback control may be utilized for tuning and calibration, as well as improving signal to noise and other optical and electronic parameters.

Figure 4:
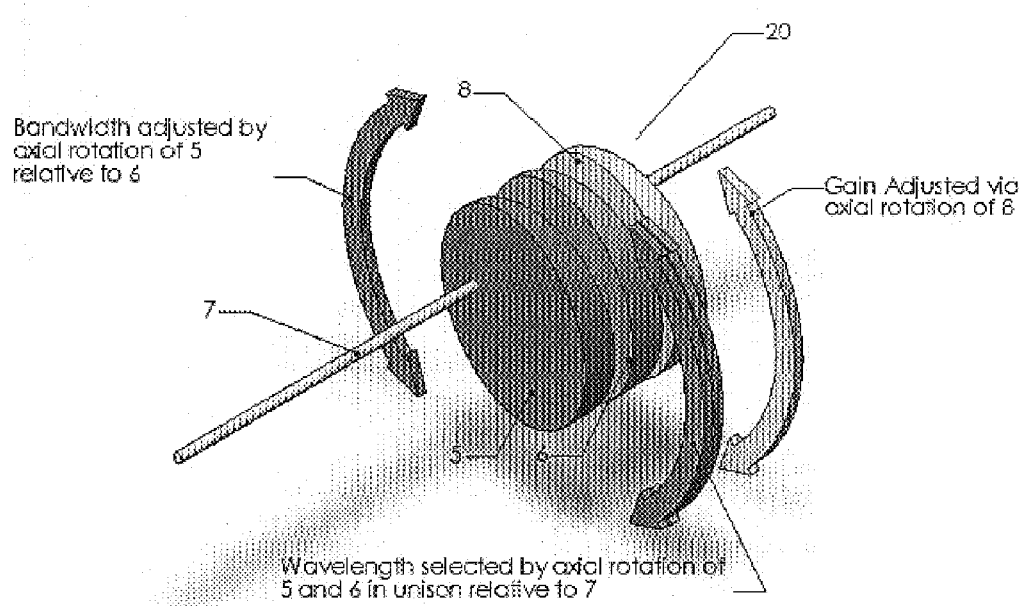
FIG. 4 is a drawing of the circularly configured Tunable Variable Bandpass Optical Filter with the enhancement of gain control.

The addition of a circularly variable neutral density filter (8) as shown in FIG. 4 would also allow for throughput gain adjustment. A linearly variable neutral density filter could also be employed, with gain adjustment by linear positioning of the linearly variable neutral density filter with respect to filters (5 and 6).

Figure 5:
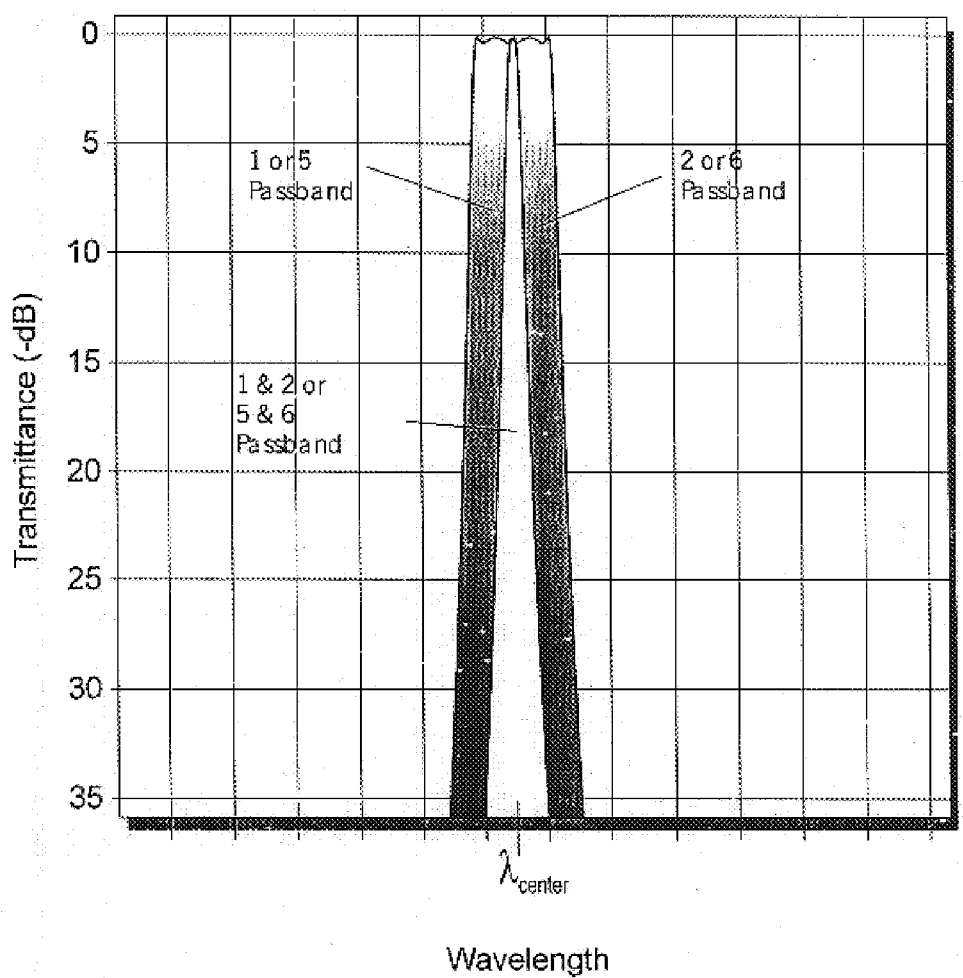
FIG. 5 is a graph showing bandpass transmittance of the Tunable Variable Bandpass Optical Filter.

FIG. 5 shows the resultant bandpass transmittance of the disclosed optical filters (10 and 20).

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

That which is claimed:

1. A tunable wavelength variable bandpass optical filter comprising:

a first optical substrate;

a second optical substrate;

said first optical substrate coated with a multilayer interference coating such that the thickness of said multilayer interference coating varies linearly in at least one direction on said optical substrate;

said second optical substrate coated with a multilayer interference coating such that the thickness of said multilayer interference coating varies linearly in at least one direction on said optical substrate;

said first optical substrate and said second optical substrate aligned in parallel geometric planes to each other with the linear thickness variations of said multilayer interference coating of said first and second optical substrates pointing in the same direction thereby creating a filter pair;

said filter pair being linearly moveable in unison through an incident collimated beam of light in order to vary the transmitted wavelength of said filter pair; and, said first optical substrate and said second optical substrate of said filter pair being individually moveable to create a relative positional change between said first optical substrate and said second optical substrate to vary the transmitted bandwidth of said filter pair.

2. The optical filter of claim 1, wherein said interference coating is applied in varying thickness across the surfaces of said first optical substrate and said second optical substrate in a linearly increasing wedged fashion.

3. The optical filter of claim 1, wherein said linearly variable multilayer interference coating is a thin-film dielectric filter coating.

4. The optical filter of claim 1, wherein one or both of said first optical substrate and said second optical substrate are moved manually for tuning and calibration of optical and electronic parameters.

5. The optical filter of claim 1, wherein one or both of said first optical substrate and said second optical substrate are moved by servo control for tuning and calibration of optical and electronic parameters.

6. The optical filter of claim 5, wherein one or both of said first optical substrate and said second optical substrate are moved by electronic drives, software algorithms, and closed-loop feedback control for tuning and calibration of optical and electronic parameters.

7. The optical filter of claim 1 further comprising a variable neutral density filter aligned in a parallel geometric plane with said filter pair that is moveable with respect to said filter pair to allow for throughput gain adjustment.

8. The optical filter of claim 7 wherein said neutral density filter is linearly variable.

9. The optical filter of claim 7, wherein said neutral density filter is circularly variable and movement for throughput gain adjustment is accomplished by axial rotation of said circularly variable neutral density filter with respect to said filter pair.

10. The optical filter of claim 1, wherein said first optical substrate and said second optical substrate are circularly variable filter discs that can be moved by axial rotation through said incident collimated beam of light in unison to select wavelength or individually to adjust bandwidth.

11. The optical filter of claim 10 further comprising a variable neutral density filter aligned in a parallel geometric plane with said filter pair that is moveable with respect to said filter pair to allow for throughput gain adjustment.

12. The optical filter of claim 11, wherein said neutral density filter is linearly variable.

13. The optical filter of claim 11, wherein said neutral density filter is circularly variable and movement for throughput gain adjustment is accomplished by axial rotation of said circularly variable neutral density filter with respect to said filter pair.

14. The optical filter of claim 1, wherein said first optical substrate and said second optical substrate are linearly variable filter rectangles that can be moved through a transmitted beam in unison to select transmitted wavelength or individually to adjust transmitted bandwidth.

15. The optical filter of claim 14, further comprising a variable neutral density filter aligned in a parallel geometric plane with said filter pair that is moveable with respect to said filter pair to allow for throughput gain adjustment.

16. The optical filter of claim 14, wherein said neutral density filter is linearly variable.

17. The optical filter of claim 14, wherein said neutral density filter is circularly variable and movement for throughput gain adjustment is accomplished by axial rotation of said circularly variable neutral density filter with respect to said filter pair.

18. A tunable wavelength variable bandpass optical filter comprising:
  a first transparent optical substrate having rectangular shape;
  a second transparent optical substrate having rectangular shape;
  said first optical substrate coated with a multilayer linearly variable thin-film dielectric filter coating applied to said first optical substrate in varying thickness across the surface of said first optical substrate in a linearly increasing wedged fashion;
  said second optical substrate coated with a multilayer linearly variable thin-film dielectric filter coating applied to said second optical substrate in varying thickness across the surface of said second optical substrate in a linearly increasing wedged fashion;
  said first optical substrate and said second substrate aligned in parallel geometric planes to each other with a separation of approximately 0.5 mm to 1.0 mm between said first optical substrate and said second optical substrate with the linear thickness variations of said multilayer interference coating of said first and second optical substrates pointing in the same direction thereby creating a filter pair;
  said filter pair being linearly moveable in unison through an incident collimated beam of light to vary the transmitted wavelengths of said filter pair;
  said first optical substrate and said second optical substrate of said filter pair being individually moveable with a linear travel between said first optical substrate and said second optical substrate to create a relative positional change between said first optical substrate and said second optical substrate to vary the transmitted bandwidth of said filter pair;
  said first optical substrate and said second optical substrate positioned via electronic drives, software algorithms, and closed-loop feedback control for tuning and calibration of optical and electronic parameters;
  a linearly variable neutral density filter aligned in a parallel geometric plane with said filter pair; and,
  said linearly variable neutral density filter moveable with respect to said filter pair to allow for throughput gain adjustment.

19. The optical filter of claim 18, wherein said neutral density filter is circularly variable and movement for throughput gain adjustment is accomplished by axial rotation of said circularly variable neutral density filter with respect to said filter pair.

20. A tunable wavelength variable bandpass optical filter comprising:
  a first transparent optical substrate having circular shape;
  a second transparent optical substrate having circular shape;
  said first optical substrate coated with a multilayer linearly variable thin-film dielectric filter coating applied to said first optical substrate in varying thickness across the surface of said first optical substrate in a circular linearly increasing wedged fashion;
  said second optical substrate coated with a multilayer linearly variable thin-film dielectric filter coating applied to said second optical substrate in varying thickness across the surface of said second optical substrate in a circular linearly increasing wedged fashion;
  said first optical substrate and said second substrate aligned in parallel geometric planes to each other with a separation of approximately 0.5 mm to 1.0 mm between said first optical substrate and said second optical substrate with the linear thickness variations of said multilayer interference coating of said first and second optical substrates pointing in the same direction thereby creating a filter pair;
  said first optical substrate and said second substrate of said filter pair being rotationally moveable in unison through an incident collimated beam of light to vary the transmitted wavelengths of said filter pair;
  said first optical substrate and said second substrate of said filter pair being individually moveable with a rotational travel between said first optical substrate and said second optical substrate to create a relative positional change between said first optical substrate and said second substrate of said filter pair to vary the transmitted bandwidth of said filter pair;
  said first optical substrate and said second optical substrate positioned via electronic drives, software algorithms, and closed-loop feedback control for tuning and calibration of optical and electronic parameters;

a linearly variable neutral density filter aligned in a parallel geometric plane with said filter pair; and, said linearly variable neutral density filter being moveable with respect to said filter pair to allow for throughput gain adjustment.

21. The optical filter of claim 20, wherein said neutral density filter is circularly variable and movement for throughput gain adjustment is accomplished by axial rotation of said circularly variable neutral density filter with respect to said filter pair.

* * * * *